(12) United States Patent
Huang et al.

(10) Patent No.: US 7,817,378 B2
(45) Date of Patent: Oct. 19, 2010

(54) SLIDER AIR BEARING WITH ASYMETRIC SIDE RAIL

(75) Inventors: Weidong Huang, San Jose, CA (US); Hidekazu Kohira, Kanagawa-Ken (JP); Yoshinori Takeuchi, Ibaraki-ken (JP)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 596 days.

(21) Appl. No.: 11/712,649

(22) Filed: Feb. 28, 2007

(65) Prior Publication Data

US 2008/0204936 A1 Aug. 28, 2008

(51) Int. Cl.
*G11B 5/60* (2006.01)
(52) U.S. Cl. .................................... 360/236.2
(58) Field of Classification Search .............. 360/236.1, 360/236.2, 236.3, 236.5, 236.8, 236.9
See application file for complete search history.

(56) References Cited

U.S. PATENT DOCUMENTS

| | | | |
|---|---|---|---|
| 3,688,287 A | 8/1972 | Perry | |
| 4,068,302 A | 1/1978 | Olmstead | |
| 4,812,927 A | 3/1989 | Fechner | |
| 4,967,155 A | 10/1990 | Magnuson | |
| 5,396,386 A * | 3/1995 | Bolasna et al. | 360/236.1 |
| 5,490,026 A * | 2/1996 | Dorius et al. | 360/236.3 |
| 5,610,784 A * | 3/1997 | Dorius et al. | 360/236.3 |
| 5,704,715 A * | 1/1998 | Chang et al. | 384/12 |
| 5,737,151 A * | 4/1998 | Bolasna et al. | 360/236.8 |
| 5,796,551 A * | 8/1998 | Samuelson | 360/236.8 |
| 5,825,588 A * | 10/1998 | Bolasna et al. | 360/236.2 |
| 5,923,487 A | 7/1999 | Carlson et al. | |
| 6,109,101 A | 8/2000 | Iwabuchi et al. | |
| 6,178,835 B1 | 1/2001 | Orriss et al. | |
| 6,333,835 B1 * | 12/2001 | Kang et al. | 360/235.4 |
| 6,415,189 B1 | 7/2002 | Hajji | |
| 6,523,413 B1 | 2/2003 | Hoshino et al. | |
| 6,574,074 B2 * | 6/2003 | Bolasna et al. | 360/236.2 |
| 6,785,094 B2 * | 8/2004 | Arya et al. | 360/244.3 |
| 7,133,258 B2 * | 11/2006 | Koishi | 360/235.6 |
| 2004/0075947 A1 * | 4/2004 | Ohwe | 360/236.2 |

(Continued)

FOREIGN PATENT DOCUMENTS

JP 58141468 8/1983

(Continued)

OTHER PUBLICATIONS

Kajewski, Steve, et al., "Integrating Shock and Vibration Testing Enchances Product Design", http://www.evaluationengineering.com/archive/articles/0100vib.htm, (2000),1-4.

(Continued)

*Primary Examiner*—Angel A. Castro

(57) ABSTRACT

A head slider for a magnetic disk drive is provided. The head slider includes a leading edge, a trailing edge, an inner diameter side and an outer diameter side of an air bearing surface. The head slider further includes a first recess on the air bearing surface of the head slider, the first recess defining a first rail proximate the inner diameter side and a second rail proximate the outer diameter side wherein the first rail and the second rail are higher with respect to the recess and are asymmetrical with respect to each other.

15 Claims, 5 Drawing Sheets

U.S. PATENT DOCUMENTS

2004/0205403 A1  10/2004  Markow et al.
2005/0168934 A1  8/2005   Wendel et al.

FOREIGN PATENT DOCUMENTS

| JP | 59002260   | 1/1984  |
| JP | 6290572    | 10/1994 |
| JP | 2000076808 | 3/2000  |
| JP | 2004063040 | 2/2004  |

OTHER PUBLICATIONS

Ruwart, Thomas M., et al., "Performance Impact of External Vibration on Consumer-grade and Enterprise-class Disk Drive", *Proceedings of the the 22nd IEEE, 13th NASA Goddard Conference on Mass Storage Systems and Technologies*, (Aug. 2005).

* cited by examiner

SLIDER AIR BEARING WITH ASYMETRIC SIDE RAIL

TECHNICAL FIELD

The field of the present invention relates to disk drive data storage devices. More particularly, embodiments of the present invention are related to altitude sensitivity and reduced drive speed sensitivity of a disk drive.

BACKGROUND ART

Disk drives are used in many electronic devices such as laptops, MP3 players, GPS, PDA devices and other devices. Slider air bearing is a key component of these drives. Some of the requirements of these drives include "low altitude sensitivity" and "low speed sensitivity" performances.

The low altitude sensitivity means that the slider air bearing has a small fly height (FH) loss at a higher altitude (such as 3000 meters) compared to the FH at sea level. The requirement for a small FH loss becomes more important for current drives with sub 10 nanometer FH.

Low speed sensitivity means that the slider air bearing has a small fly height loss at low speed operation (e.g., during a servo track write) compared to fly height loss at operational speeds.

SUMMARY OF THE INVENTION

Embodiments of the present invention include a head slider for a magnetic disk drive. In one embodiment of the invention, the head slider includes a leading edge, a trailing edge, an inner diameter side and an outer diameter side of an air bearing surface. The head slider further includes a first recess on the air bearing surface of the head slider, the first recess defining a first rail proximate the inner diameter side and a second rail proximate the outer diameter side wherein the first rail and the second rail are higher with respect to the recess and are asymmetrical with respect to each other.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to embodiment(s) of the present invention. While the invention will be described in conjunction with the embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, and components have not been described in detail as not to unnecessarily obscure aspects of the present invention.

The discussion will begin with an overview of a hard disk drive and components connected within. The discussion will then focus on embodiments of the invention that provide a disk drive with asymmetrical side rails for improved low speed disk operation and improved high altitude operation. The discussion will then focus on embodiments of this invention that provide a slider with asymmetrical side rails. In one embodiment, the side rail on the outer diameter side includes a discontinuity for reduced fly height loss at low speed operation and for reduced fly height loss at high altitude operation. The present invention also provides a side rail on the inner diameter side that includes a discontinuity for reduced fly height loss at low speed operation and for reduced fly height loss at high altitude operation.

Although embodiments of the present invention will be described in conjunction with a hard disk drive slider, it is understood that the embodiments described herein are useful outside of the art of disk drive sliders, such as devices requiring high frequency transmission between two devices that have relative motion.

The utilization of a rectangular shaped side rail is only one embodiment and is provided herein merely for purposes of brevity and clarity. It is appreciated that the "side rail" of the present invention could be of any shape, or configuration such that the dimensions and or shape of the inner diameter and outer diameter "side rails" are asymmetrical. In accordance with the present invention, a slider with asymmetrical side rails has reduced fly height loss at low speed operation (e.g., 3200-4000 RPM during a servo track write) and reduced fly height loss at high altitude (e.g., 8,000 feet and above).

Overview

Figure 1:
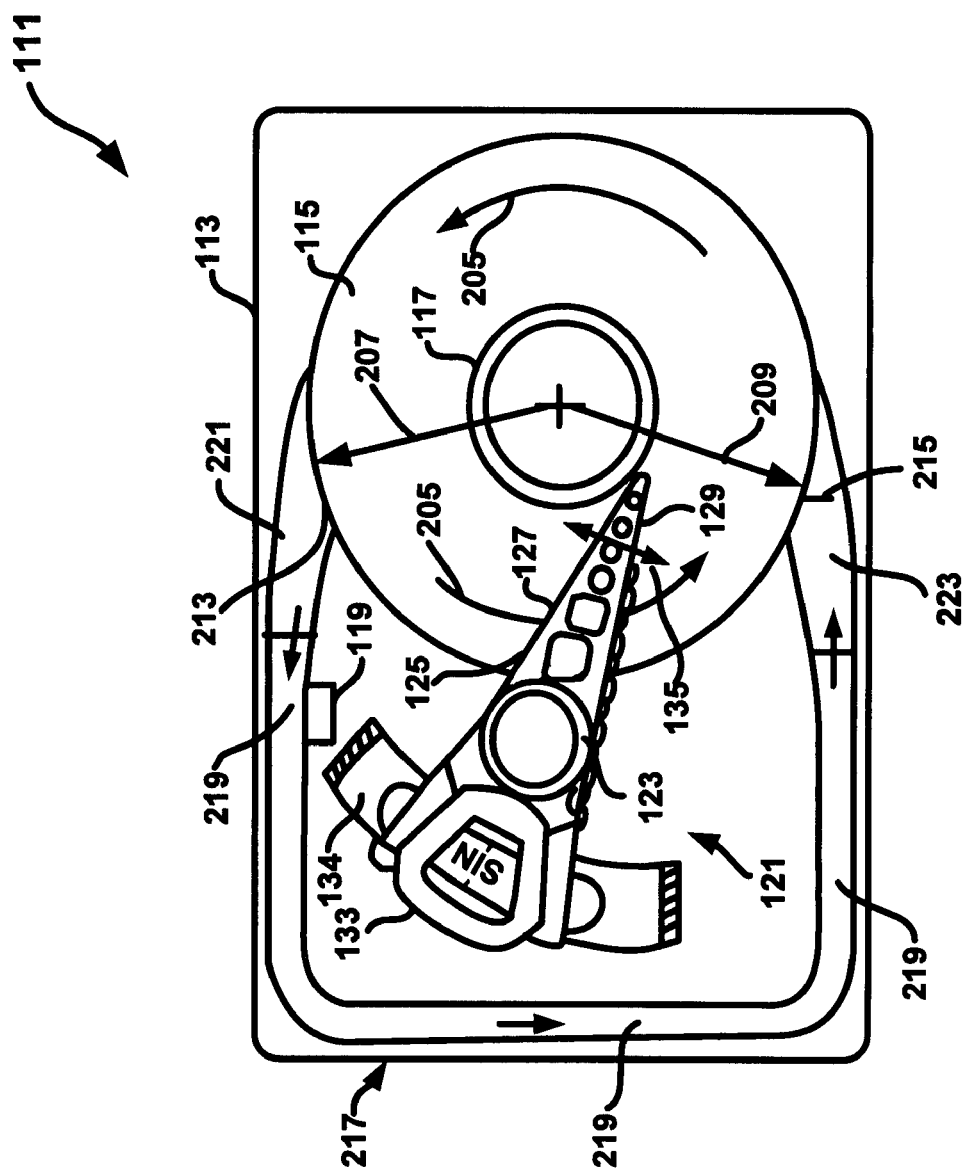
FIG. 1 is a schematic, top plan view of a hard disk drive in accordance with one embodiment of the present invention.

With reference now to FIG. 1, a schematic drawing of one embodiment of an information storage system comprising a magnetic hard disk file or drive 111 for a computer system is shown. Drive 111 has an outer housing or base 113 containing a disk pack having at least one media or magnetic disk 115. A spindle motor assembly having a central drive hub 117 rotates the disk or disks 115. An actuator 121 comprises a plurality of parallel actuator arms 125 (one shown) in the form of a comb that is movably or pivotally mounted to base 113 about a pivot assembly 123. A controller 119 is also mounted to base 113 for selectively moving the comb of arms 125 relative to disk 115.

In the embodiment shown, each arm 125 has extending from it at least one cantilevered electrical lead suspension (ELS) 127 (load beam removed). It should be understood that ELS 127 may be, in one embodiment, an integrated lead suspension (ILS) that is formed by a subtractive process. In another embodiment, ELS 127 may be formed by an additive process, such as a Circuit Integrated Suspension (CIS). In yet another embodiment, ELS 127 may be a Flex-On Suspension (FOS) attached to base metal or it may be a Flex Gimbal Suspension Assembly (FGSA) that is attached to a base metal layer.

The ELS may be any form of lead suspension that can be used in a Data Access Storage Device, such as a HDD. A magnetic read/write transducer or head is mounted on a slider 129 and secured to a flexure that is flexibly mounted to each ELS 127. The read/write heads magnetically read data from and/or magnetically write data to disk 115. The level of integration called the head gimbal assembly is the head and the slider 129, which are mounted on suspension 127. The slider 129 is usually bonded to the end of ELS 127

ELS 127 has a spring-like quality, which biases or presses the air-bearing surface of the slider 129 against the disk 115 to cause the slider 129 to fly at a precise distance from the disk. The ELS 127 has a hinge area that provides for the spring-like quality, and a flexing interconnect (or flexing interconnect) that supports read and write traces through the hinge area. A voice coil 133, free to move within a conventional voice coil motor magnet assembly 134 (top pole not shown), is also mounted to arms 125 opposite the head gimbal assemblies.

Movement of the actuator 121 (indicated by arrow 135) by controller 119 causes the head gimbal assemblies to move along radial arcs across tracks on the disk 115 until the heads settle on their set target tracks. The head gimbal assemblies operate in a conventional manner and move in unison with one another, unless drive 111 uses multiple independent actuators (not shown) wherein the arms can move independently of one another.

To improve magnetic head positioning accuracy, it is necessary to write servo information with lower rotational speed than operational speed. Embodiments of the present invention include an air bearing surface (ABS) design which is insensitive to rotational speed and altitude simultaneously.

Embodiments of the present invention use asymmetrical side rails on the air bearing surface of a disk drive slider to improve fly height loss at high altitudes and/or reduced operating speeds, especially while writing servo tracks and high altitude operation. More particularly, embodiments of the present invention include a disk drive slider with a rail discontinuity close to the outer diameter edge of the slider. Embodiments of the present invention are directed towards disk drives for use in any disk drive system including desktop computer systems and mobile computer systems.

Figure 2:
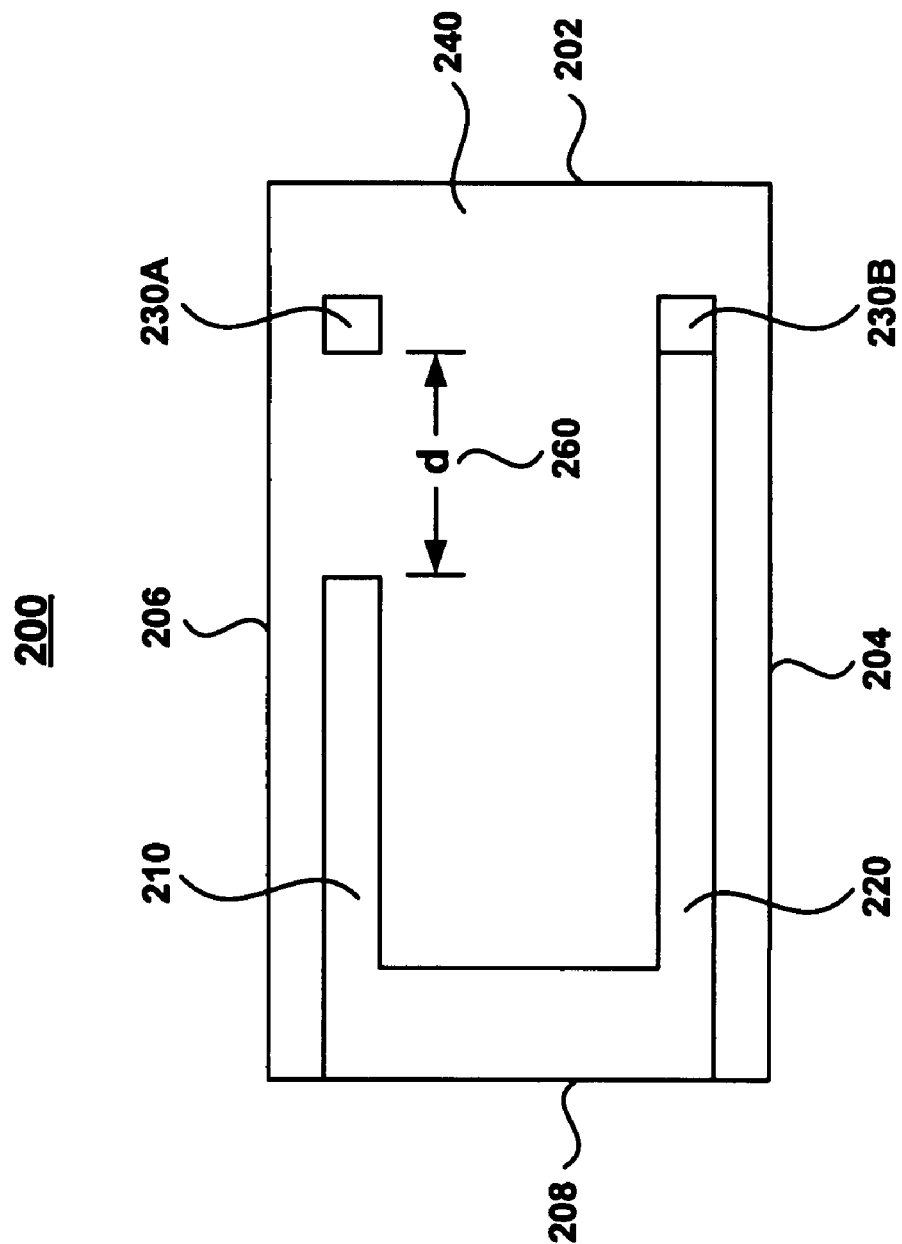
FIG. 2 is a top view of an exemplary disk drive slider including asymmetrical side rails in accordance with embodiments of the present invention.

FIG. 2 is a top view of an exemplary disk drive slider 200 including asymmetrical side rails 210 and 220 in accordance with embodiments of the present invention. As stated above, the present invention includes a disk drive slider 200 with a discontinuity 260 on one of the side rails 210 and 220. In one embodiment of the invention, the discontinuity 260 is located proximate the outer diameter side 206. In another embodiment, the discontinuity 260 is located proximate the inner diameter side 204.

It is appreciated that the terms "inner diameter side 204" and "outer diameter side 206" describe the side of the slider with respect to the inner diameter and outer diameter of the rotating disk of the hard disk drive. The terms "leading edge 208" and "trailing edge 202" are used to describe the side of a disk drive slider with respect to the rotational direction of the hard disk.

In one embodiment of the invention, the side rail 220 on the inner diameter side 204 does not have a discontinuity and is directly adjacent to a landing pad 230B. The discontinuity 260 may be located closer to the leading edge 208 or the trailing edge 202. The discontinuity may also be located in the middle of the leading edge 208 and the trailing edge 202.

In one embodiment of the invention, the landing pad 230B is integral with the side rail 220. The outer diameter side 206 also includes a landing pad 230A. In this embodiment, the discontinuity 260 between the side rail 210 and the landing pad 230A provides an air leak for air to escape from under the air bearing surface 240 of the slider 200. In one embodiment, the leak reduces fly height loss at low speed operation. It is appreciated that the leak may increase outer diameter fly height loss at high altitude operation but since there is more fly height loss margin at the outer diameter, the degradation can be accepted and the benefits of the reduced fly height loss at low speed operation outweigh the degradation of outer diameter fly height at high altitude.

Figure 3:
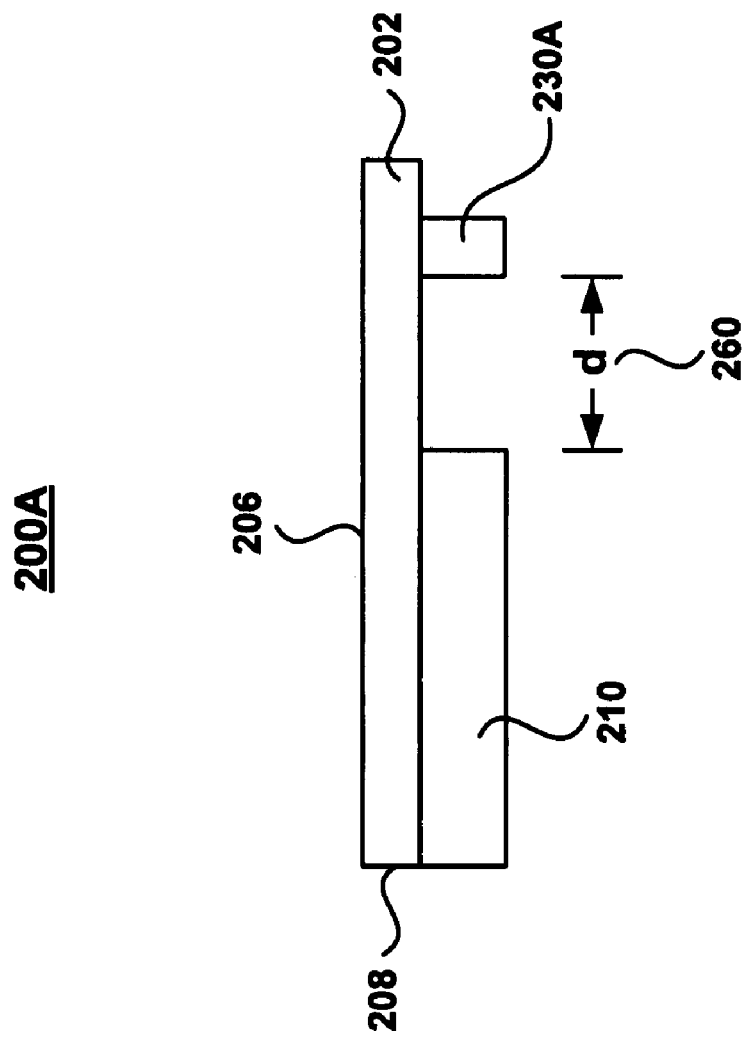
FIG. 3 is a cross sectional view of an exemplary disk drive slider comprising a side rail with a discontinuity in accordance with embodiments of the present invention.

FIG. 3 is a cross sectional view 200A of an exemplary disk drive slider comprising a side rail 210 with a discontinuity 260 in accordance with embodiments of the present invention. As stated above, the discontinuity 260 may be located proximate the inner diameter side or the outer diameter side of the disk drive slider. FIG. 3 illustrates the discontinuity 260 on the outer diameter side 206 of the slider. The discontinuity leaves a gap between the side rail 210 and the landing pad 230A.

Figure 4:
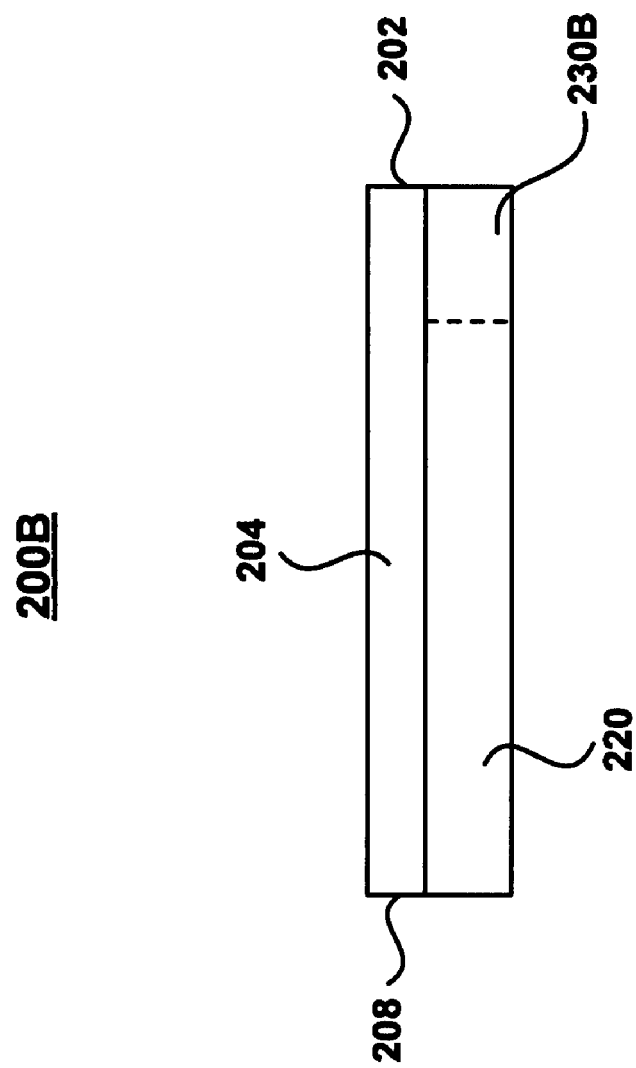
FIG. 4 is a cross sectional view of an exemplary disk drive slider comprising a side rail adjacent to a landing pad in accordance with embodiments of the present invention.

FIG. 4 is a cross sectional view 200B of an exemplary disk drive slider comprising a side rail 220 adjacent to a landing pad 230B in accordance with embodiments of the present invention. The side-view 200B shows the side rail 220 contacting landing pad 230B. As stated above, side rail 220 and landing pad 230B may be integral, as indicated by the dotted line separating the landing pad 230B from the side rail 220.

Figure 5:
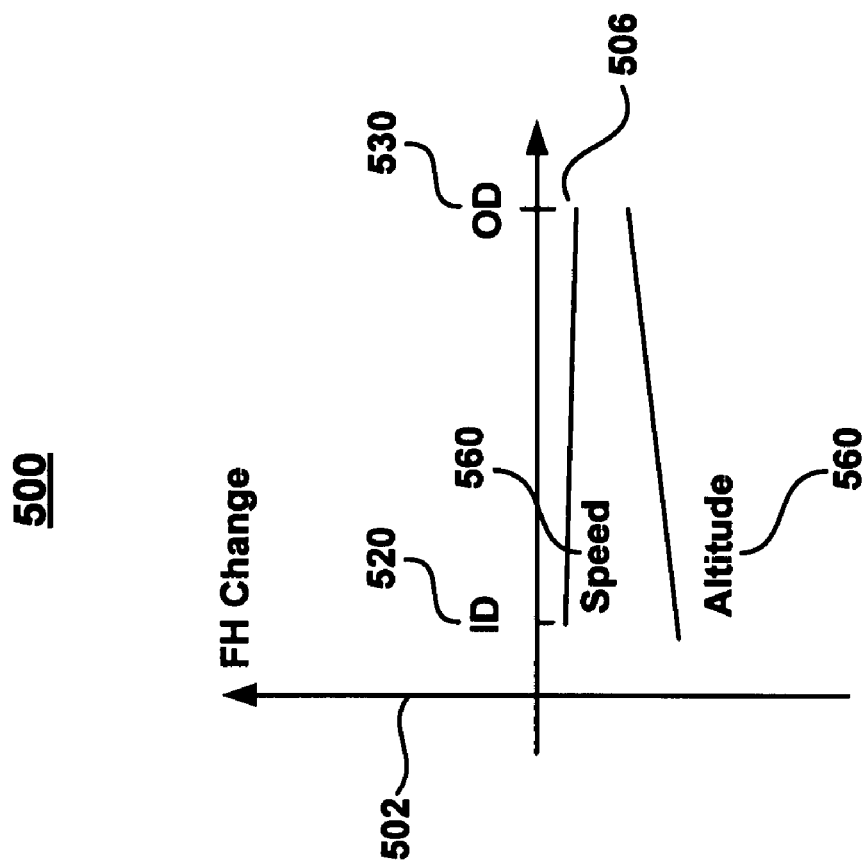
FIG. 5 is an illustration of exemplary fly height characteristics of a disk drive slider comprising asymmetrical side rails in accordance with embodiments of the present invention.

FIG. 5 is an illustration of exemplary fly height characteristics of a disk drive slider comprising asymmetrical side rails in accordance with embodiments of the present invention. The graph 500 illustrates the fly height changes at low speed 506 and at high altitude 560. As illustrated, the fly height 502 of the slider remains almost constant at low speed 506 from the inner diameter 520 to the outer diameter 530 of a hard disk in a hard disk drive. As also shown, the fly height 502 of the slider remains almost constant at high altitude 560 from the inner diameter 520 to the outer diameter 530 of a hard disk in a hard disk drive. These exemplary fly height characteristics are desired for improved low speed operation and for improved high altitude performance.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and it's practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A head slider for a magnetic disk drive, said slider comprising a leading edge, a trailing edge, an inner diameter side and an outer diameter side of an air bearing surface, said head slider further comprising:
   a first rail proximate said inner diameter side formed above said air bearing surface;
   a second rail proximate said outer diameter side formed above said air bearing surface wherein said first rail and said second rail are higher with respect to said air bearing surface and are asymmetrical in length with respect to each other and symmetrical with respect to width with respect to each other;

a first landing pad disposed on said air bearing surface adjacent to said first rail wherein said first landing pad contacts said first rail; and a second landing pad disposed on said air bearing surface adjacent to said second rail wherein a gap separates said second landing pad from second rail.

2. The head slider as described in claim 1 wherein said first rail comprises a discontinuity along said inner diameter side.

3. The head slider as described in claim 1 wherein said second rail comprises a discontinuity along said outer diameter side.

4. The head slider as described in claim 1 wherein said first rail and said second rail are coupled to each other at said leading edge of said air bearing surface.

5. The head slider as described in claim 1 wherein said first rail has a length along said inner diameter side and said second rail has a length along said outer diameter side wherein said length of said first rail is greater than said length of said second rail.

6. A disk drive assembly comprising:

a rotatable magnetic disk; and a head gimbal assembly coupled to an actuator, said head gimbal assembly comprising a head slider, said slider comprising a leading edge, a trailing edge, an inner diameter side and an outer diameter side of an air bearing surface, said head slider further comprising:

a first rail proximate said inner diameter side formed above said air bearing surface;

a second rail proximate said outer diameter side formed above said air bearing surface wherein said first rail and said second rail are higher with respect to said air bearing surface and are asymmetrical in length with respect to each other and symmetrical with respect to width with respect to each other;

a first landing pad disposed on said air bearing surface adjacent to said first rail wherein said first landing pad contacts said first rail; and a second landing pad disposed on said air bearing surface adjacent to said second rail wherein a gap separates said second landing pad from second rail.

7. The disk drive assembly as described in claim 6 wherein said first rail comprises a discontinuity along said inner diameter side.

8. The disk drive assembly as described in claim 6 wherein said second rail comprises a discontinuity along said outer diameter side.

9. The disk drive assembly as described in claim 6 wherein said first rail and said second rail are coupled to each other at said leading edge of said air bearing surface.

10. The disk drive assembly as described in claim 6 wherein said first rail has a length along said inner diameter side and said second rail has a length along said outer diameter side wherein said length of said first rail is greater than said length of said second rail.

11. A head gimbal assembly comprising a head slider for reducing fly height loss at altitude and for reducing fly height loss at lowered disk drive speeds, said head slider comprising:

a first rail proximate said inner diameter side formed above said air bearing surface;

a second rail proximate said outer diameter side formed above said air bearing surface wherein said first rail and said second rail are higher with respect to said air bearing surface and are asymmetrical in length with respect to each other and symmetrical with respect to width with respect to each other;

a first landing pad disposed on said air bearing surface adjacent to said first rail wherein said first landing pad contacts said first rail; and a second landing pad disposed on said air bearing surface adjacent to said second rail wherein a gap separates said second landing pad from second rail.

12. The head gimbal assembly as described in claim 11 wherein said first rail comprises a discontinuity along said inner diameter side.

13. The head gimbal assembly as described in claim 11 wherein said second rail comprises a discontinuity along said outer diameter side.

14. The head gimbal assembly as described in claim 11 wherein said first rail and said second rail are coupled to each other at said leading edge of said air bearing surface.

15. The head gimbal assembly as described in claim 11 wherein said first rail has a length along said inner diameter side and said second rail has a length along said outer diameter side wherein said length of said first rail is greater than said length of said second rail.

* * * * *